US010166606B2

(12) United States Patent
Fujii

(10) Patent No.: US 10,166,606 B2
(45) Date of Patent: Jan. 1, 2019

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Kanenori Fujii, Dusseldorf (DE)

(73) Assignee: KYOCERA CORPORATION, Kyoto (JP)

( * ) Notice: Subject to any disclaimer, the term of this patent is extended or adjusted under 35 U.S.C. 154(b) by 139 days.

(21) Appl. No.: 15/129,093

(22) PCT Filed: Mar. 26, 2015

(86) PCT No.: PCT/JP2015/059480
§ 371 (c)(1),
(2) Date: Sep. 26, 2016

(87) PCT Pub. No.: WO2015/147214
PCT Pub. Date: Oct. 1, 2015

(65) Prior Publication Data
US 2017/0120342 A1    May 4, 2017

(30) Foreign Application Priority Data
Mar. 27, 2014 (JP) ................................. 2014-065293

(51) Int. Cl.
*B23B 27/14* (2006.01)
(52) U.S. Cl.
CPC .... *B23B 27/143* (2013.01); *B23B 2200/0447* (2013.01); *B23B 2200/081* (2013.01); *B23B 2270/20* (2013.01)
(58) Field of Classification Search
CPC .............. B23B 27/143; B23B 27/1607; B23B 27/1618; B23B 27/1648; B23B 2200/081;
(Continued)

(56) References Cited

U.S. PATENT DOCUMENTS 7,374,372 B2 * 5/2008 Rofner ................ B23B 27/1618
407/113
8,727,676 B2 * 5/2014 Lof ........................ B23B 27/143
407/113
(Continued)

FOREIGN PATENT DOCUMENTS

JP    2007-007736 A    1/2007
JP    2010-042462 A    2/2010

OTHER PUBLICATIONS

International Search Report (Form PCT/ISA/210) dated Jun. 9, 2015, issued for PCT/JP2015/059480.

*Primary Examiner* — Nicole N Ramos
(74) *Attorney, Agent, or Firm* — Volpe and Koenig, P.C.

(57) ABSTRACT

A cutting insert of one aspect includes a top surface including a first corner portion and a second corner portion; and a top cutting edge. The top cutting edge includes a first corner cutting edge, a first major cutting edge, a second corner cutting edge, and a second major cutting edge. The top surface includes a first breaker protrusion and a second breaker protrusion. A gap between the first breaker protrusion and the first corner cutting edge is larger than a gap between the second breaker protrusion and the second corner cutting edge, a gap between the first breaker protrusion and the first major cutting edge becomes larger as a distance from the first corner cutting edge increases, and a gap between the second breaker protrusion and the second major cutting edge becomes smaller as a distance from the second corner cutting edge increases.

9 Claims, 14 Drawing Sheets

(58) Field of Classification Search
CPC ........ B23B 2200/087; B23B 2200/086; B23B 2200/321; B23B 2200/323; B23B 2200/325; Y10T 407/235; Y10T 407/24; Y10T 407/23; Y10T 407/245
See application file for complete search history.

(56) References Cited

U.S. PATENT DOCUMENTS

| | | | |
|---|---|---|---|
| 2005/0019111 A1* | 1/2005 | Kitagawa | B23B 27/141 |
| | | | 407/113 |
| 2008/0219784 A1* | 9/2008 | Yamazaki | B23B 27/143 |
| | | | 407/114 |
| 2012/0198973 A1* | 8/2012 | Schleinkofer | B23B 27/143 |
| | | | 82/117 |
| 2012/0237305 A1* | 9/2012 | Lee | B23B 27/007 |
| | | | 407/114 |
| 2013/0064613 A1* | 3/2013 | Krishtul | B23B 27/143 |
| | | | 407/114 |
| 2014/0248098 A1* | 9/2014 | Pacheri | B23B 27/1607 |
| | | | 407/114 |

* cited by examiner

CUTTING INSERT, CUTTING TOOL, AND METHOD FOR MANUFACTURING MACHINED PRODUCT

TECHNICAL FIELD

The present embodiment relates to a cutting insert, a cutting tool, and a method for manufacturing a machined product.

BACKGROUND ART

Examples of known cutting inserts used for machining a work material such as a metal include throw-away tips described in Japanese Unexamined Patent Application Publication No. 2010-042462A (Patent Document 1) and Japanese Unexamined Patent Application Publication No. 2007-007736A (Patent Document 2). The tip recited in Patent Document 2 has a rhombic shaped top surface and bottom surface, of which one constitutes a rake face and the other constitutes a seating face. A chip breaker is formed on each of the top surface and the bottom surface, toward an acute-angled corner portion and an obtuse-angled corner portion. Here, the chip breaker on the side of the top surface and the bottom surface, serving as the seating face, is a surface that contacts a holder.

When attaching the cutting insert to the holder, the closer the surface of the top surface and the bottom surface that contacts the holder is located to the corner portions of the top surface and the bottom surface, the more stably the cutting insert can be secured to the holder. Particularly, in cases where performing machining using the obtuse-angled corner portion, the behavior of the chips easily becomes unstable due to the thickness of the chips becoming thinner. However, the chips can be processed well by positioning the surface that contacts the holder near the corner portions of the top surface and the bottom surface. Additionally, in cases where performing machining using the acute-angled corner portion, the surface that contacts the holder may come excessively close to the acute-angled corner portion due to the thickness of the chips becoming thicker. In this case, space for curling the chips becomes smaller and, consequently, the processing of the chips may become unstable.

In light of the problems described above, an object of the present invention is to provide a cutting insert that can be stably secured in a holder and can process chips well.

SUMMARY OF INVENTION

A cutting insert according to an aspect includes a top surface having a polygonal shape in a top view and including a first corner portion with an acute angle and a second corner portion with an obtuse angle, a bottom surface, a side surface located between the top surface and the bottom surface, and a top cutting edge disposed along a ridge line at an intersection between the top surface and the side surface. The top cutting edge includes a first corner cutting edge located in the first corner portion, a first major cutting edge adjacent to the first corner cutting edge, a second corner cutting edge located in the second corner portion, and a second major cutting edge adjacent to the second corner cutting edge. The top surface includes a first breaker protrusion protruding toward the first corner portion, and a second breaker protrusion protruding toward the second corner portion.

A gap between the first breaker protrusion and the first corner cutting edge is larger than a gap between the second breaker protrusion and the second corner cutting edge in a top view. Additionally, a gap between the first breaker protrusion and the first major cutting edge becomes larger as a distance from the first corner cutting edge increases, and a gap between the second breaker protrusion and the second major cutting edge becomes smaller as a distance from the second corner cutting edge increases in a top view.

DESCRIPTION OF EMBODIMENTS

Cutting Insert

Figure 1:
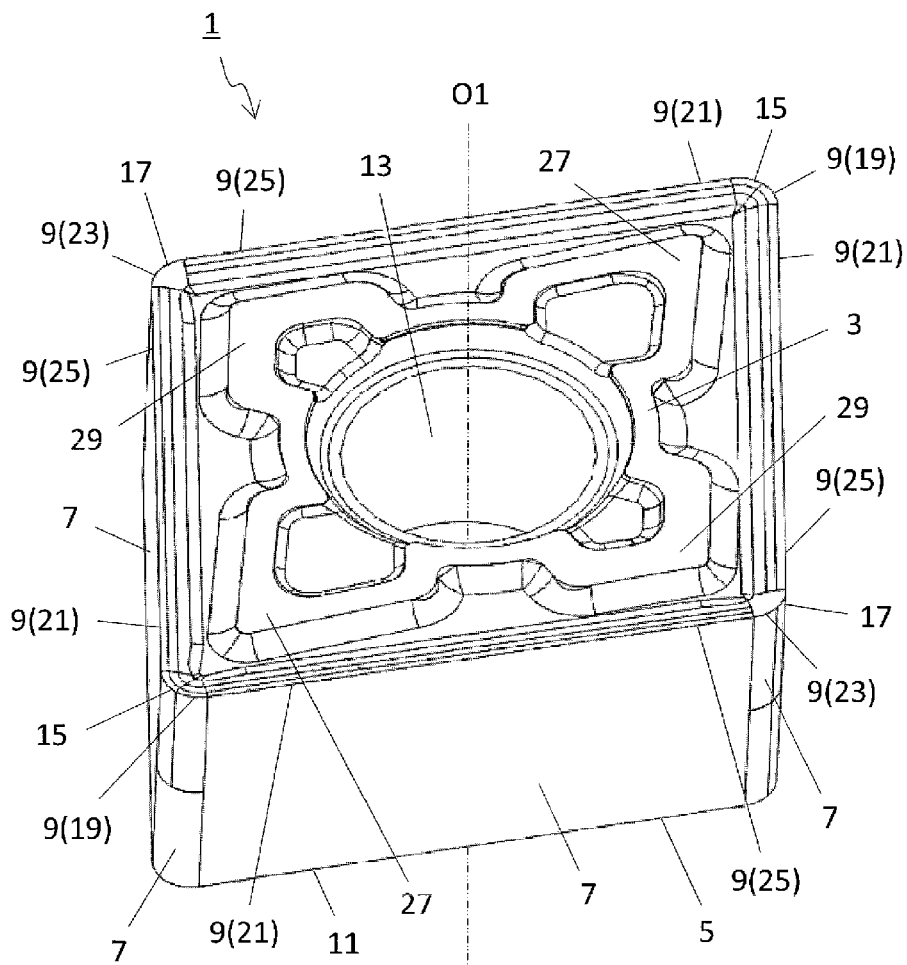
FIG. 1 is a perspective view illustrating a cutting insert of a first embodiment of the present invention.

The following describes in detail a cutting insert of embodiments using the drawings. However, for convenience of explanation, each of the drawings referenced below is simplified to illustrate only the main members, of the constituent members of the embodiments that are necessary to illustrate the present invention. Accordingly, the cutting insert of the present invention may be provided with any constituent member which is not illustrated in each of the referenced drawings. Further, the dimensions of the members in the drawings do not faithfully represent the actual dimensions of the constituent members, the dimension ratios of the members, or the like.

The cutting insert 1 (hereinafter also simply referred to as "insert 1") in the first embodiment includes, for example, a top surface 3, a bottom surface 5, side surfaces 7, top cutting edges 9, bottom cutting edges 11, and a through-hole 13, as illustrated in FIG. 1. Examples of the material of the insert 1 include cemented carbide alloy, cermet, or the like.

Examples of the composition of the cemented carbide alloy include, for example, WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound such as titanium carbide (TiC), or titanium nitride (TiN) is the main component.

The surfaces of the members described above constituting the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

The top surface 3 has a polygonal shape and, in the present embodiment, has a rhomboid shape. Here, the polygonal shape does not strictly refer to a shape of a polygon. For example, each of the corner portions of the top surface 3 in the present embodiment is not a strict corner but, rather, in a top view of the insert 1, is a rounded shape. Additionally, the edges connecting adjacent corners need not be strictly linear. For example, in a top view of the insert 1, each may have a shape that slightly protrudes outward.

Figure 2:
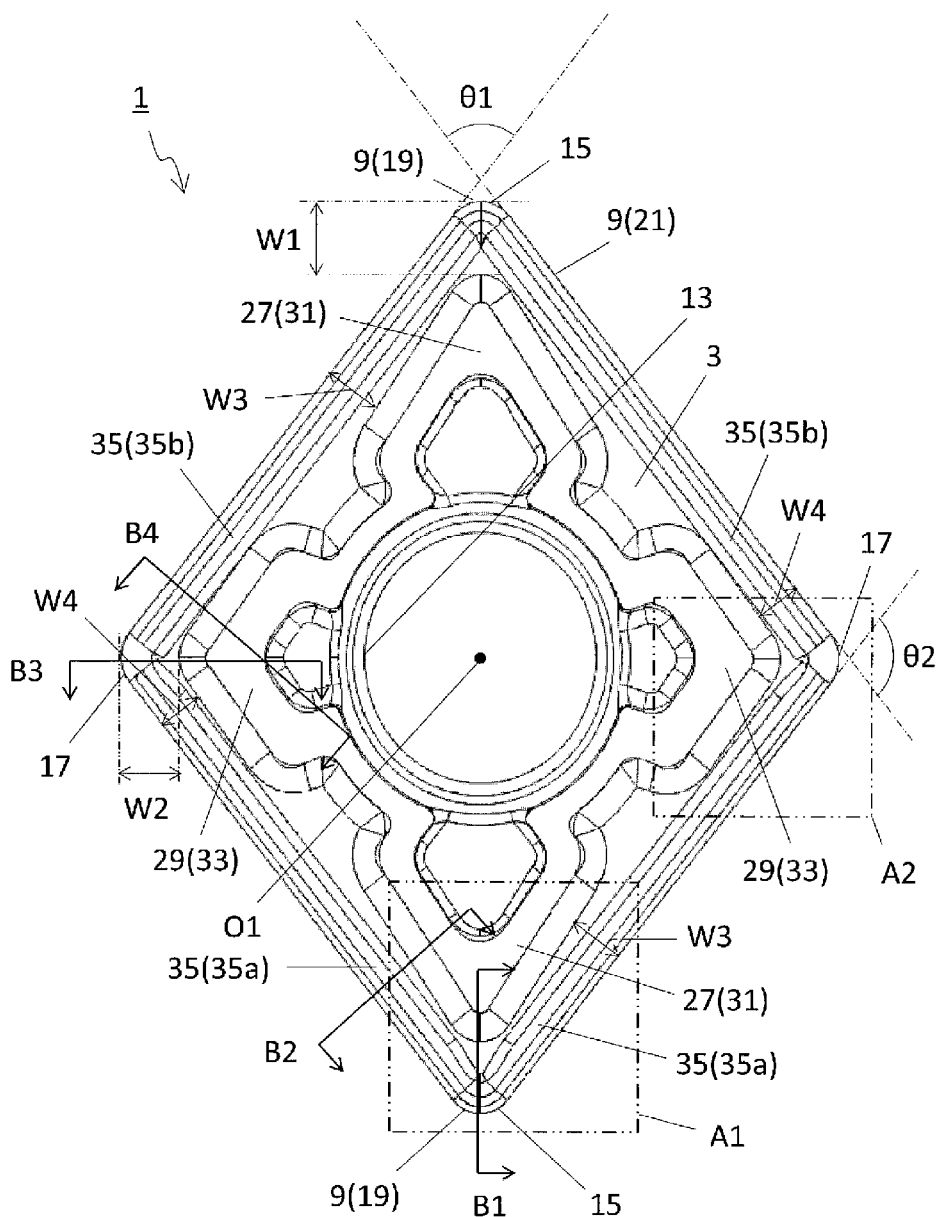
FIG. 2 is a top view of the cutting insert illustrated in FIG. 1.
Figure 3:
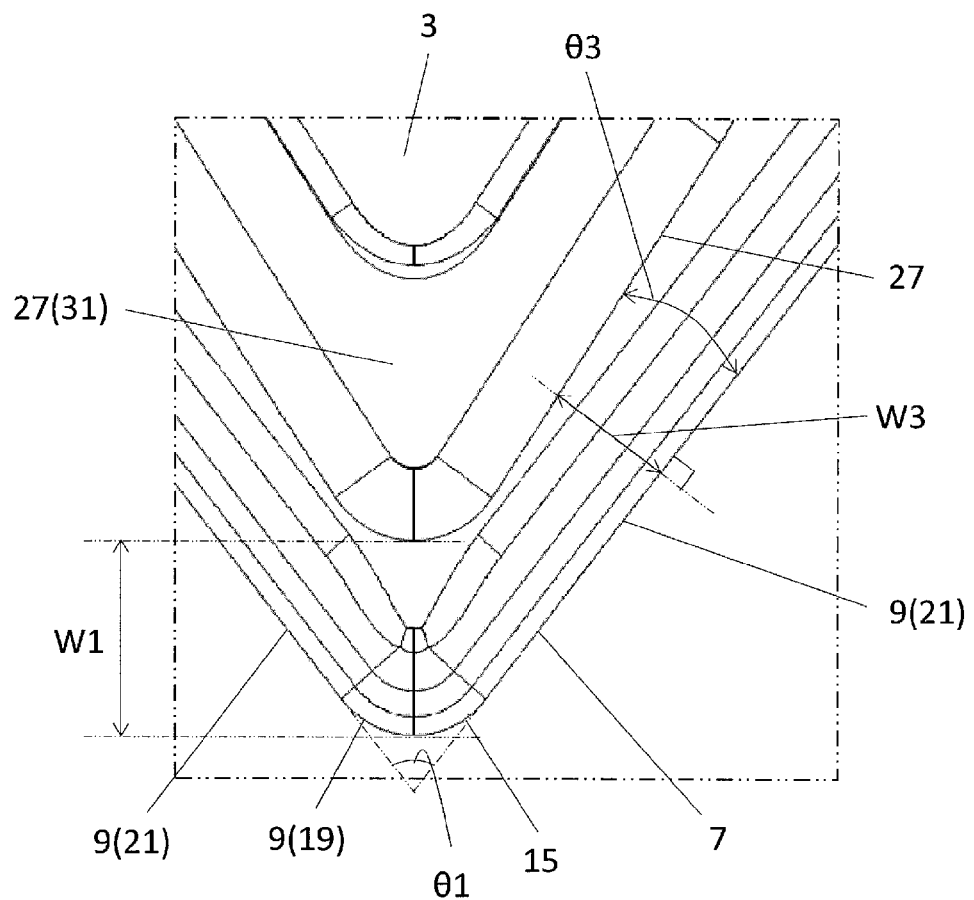
FIG. 3 is an enlarged top view of a region A1 of the cutting insert illustrated in FIG. 2.
Figure 4:
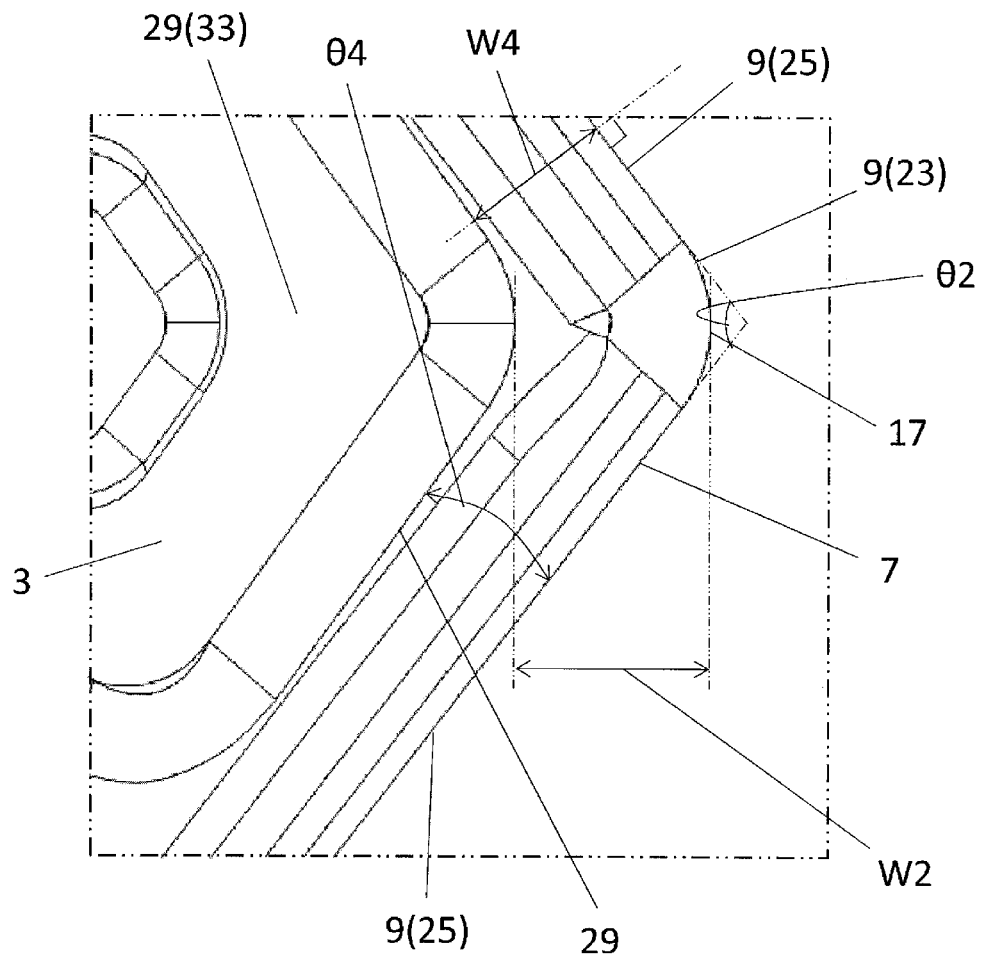
FIG. 4 is an enlarged top view of a region A2 of the cutting insert illustrated in FIG. 2.
Figure 5:
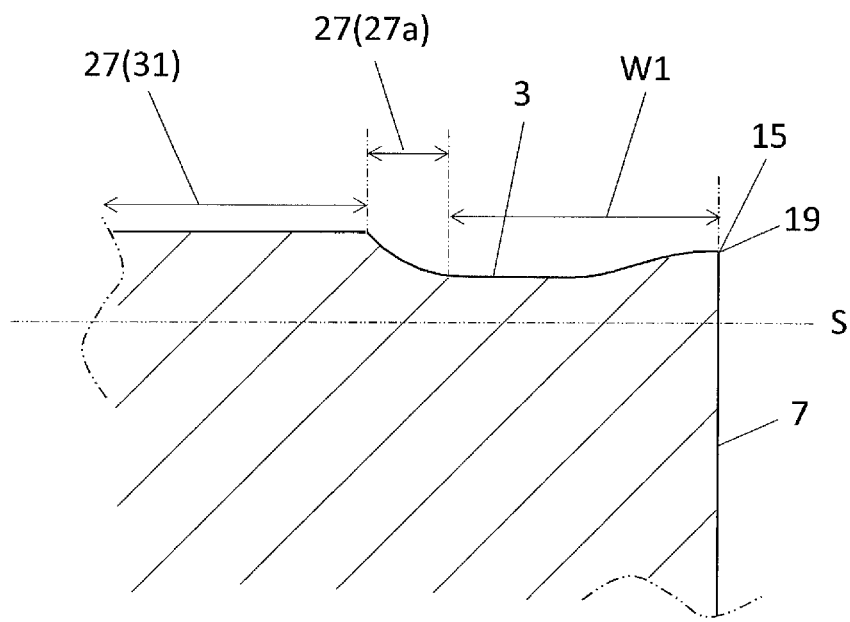
FIG. 5 is a cross-sectional view along a cross-section B1-B1 of the cutting insert illustrated in FIG. 2.
Figure 6:
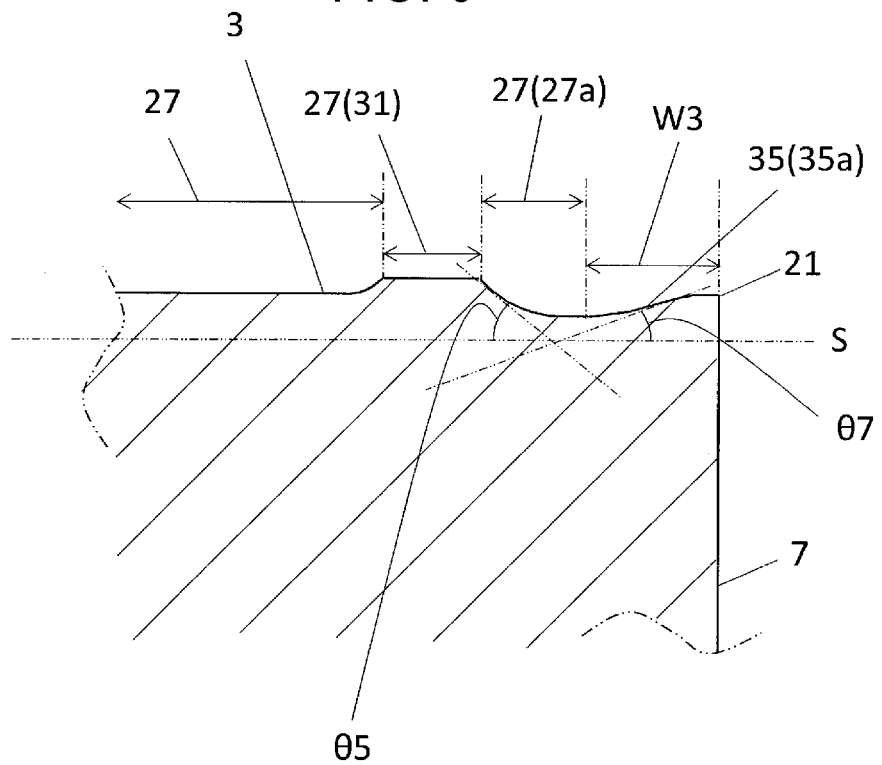
FIG. 6 is a cross-sectional view along a cross-section B2-B2 of the cutting insert illustrated in FIG. 2.
Figure 7:
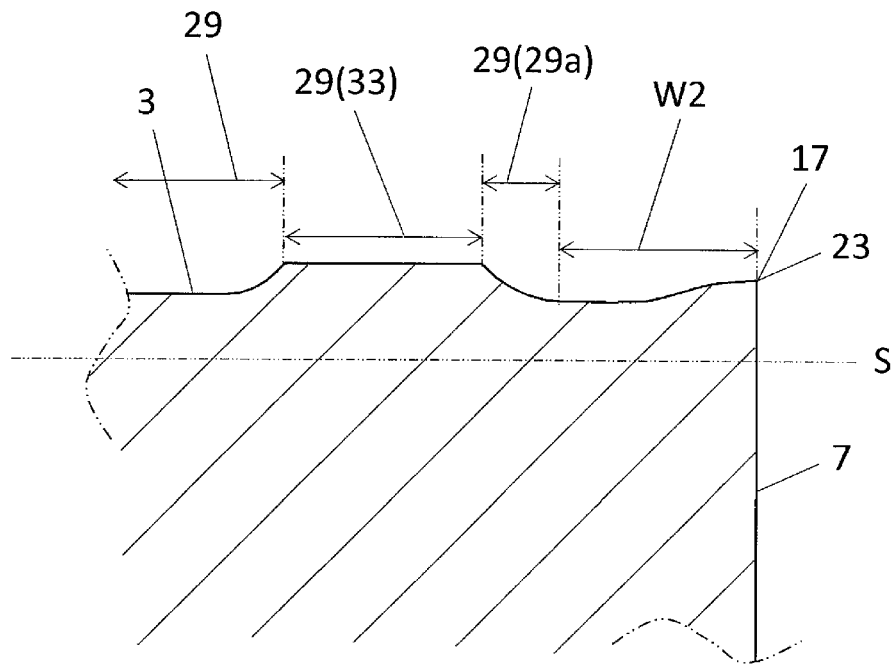
FIG. 7 is a cross-sectional view along a cross-section B3-B3 of the cutting insert illustrated in FIG. 2.
Figure 8:
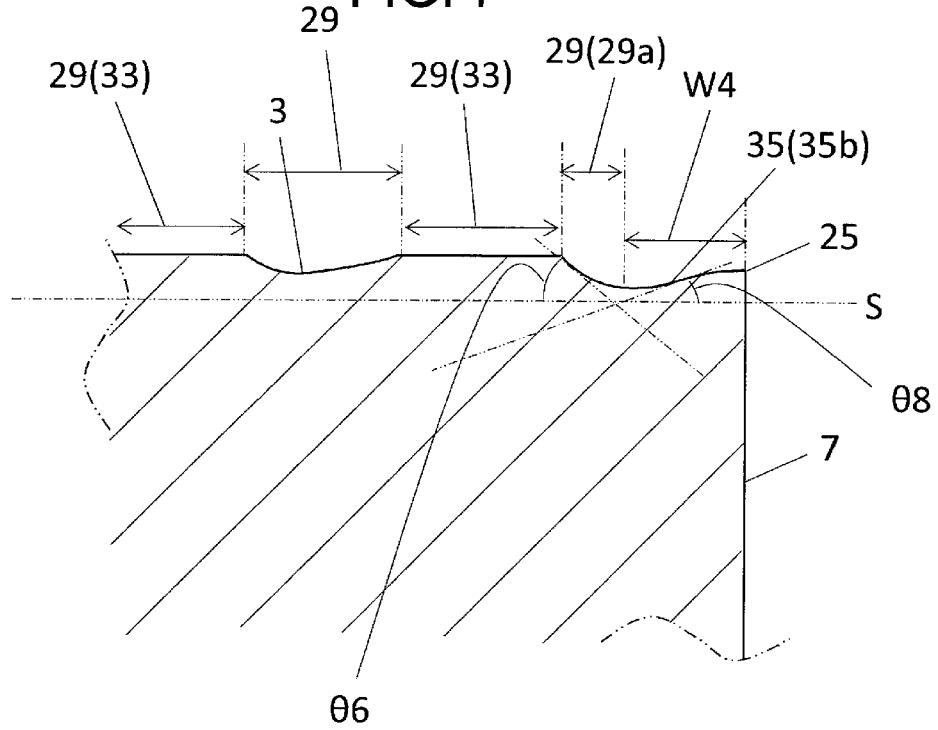
FIG. 8 is a cross-sectional view along a cross-section B4-B4 of the cutting insert illustrated in FIG. 2.

In a top view of the insert 1, the top surface 3 of the present embodiment includes, as corners, a first corner portion 15 with an acute angle and a second corner portion 17 with an obtuse angle. As illustrated in FIG. 2, the top surface 3 includes two of each of the first corner portion 15 and the second corner portion 17. Thus, one or a plurality of each of the first corner portion 15 and the second corner portion 17 may be provided.

"A first corner portion 15 with an acute angle" means that, in a top view of the insert 1, an angle θ1 where two edges, which continue to and extend from the first corner portion 15, intersect is an acute angle. "A second corner portion 17 that is an obtuse angle" means that, in a top view of the insert 1, an angle θ2 where two edges, which continue to and extend from the second corner portion 17, intersect is an obtuse angle.

The bottom surface 5 is a surface located on a side opposite the top surface 3, and functions as a seat of an insert pocket when the insert 1 is attached to a holder. The bottom surface 5 in the present embodiment has the same shape as that of the top surface 3, and thus has a substantially rhomboid shape similar to that of the top surface 3. While not particularly illustrated, an outer periphery of the bottom surface 5 overlaps with an outer periphery of the top surface 3 in a plane perspective.

Here, the shapes of the top surface 3 and the bottom surface 5 are not limited to those in the embodiment described above. While the shape of the top surface 3 of the insert 1 in the present embodiment is substantially quadrilateral in a top view of the insert 1, the shape of the top surface 3 may be a polygonal shape such as a triangle or a pentagon in a top view of the insert 1. Furthermore, while the top surface 3 in the present embodiment has a rhombic shape, the quadrilateral shape is not limited to such a shape, and the shape may be a parallelogram, for example.

The insert 1 of the present embodiment includes the through-hole 13 disposed from a center of the top surface 3 towards a center of the bottom surface 5. The through-hole 13 is provided for screw insertion when screw-fastening and securing the insert 1 to a holder of a cutting tool. A central axis O1 of the through-hole 13 matches an imaginary line passing through the center of the top surface 3 and the center of the bottom surface 5.

The side surfaces 7 are located between the top surface 3 and the bottom surface 5, and are connected to the top surface 3 and the bottom surface 5. Furthermore, in the present embodiment, the side surfaces 7 are each linear in a cross section parallel to the central axis O1 of the through-hole 13.

A maximum width when the top surface 3 of the insert 1 in the present embodiment is viewed directly from above is from 6 to 25 mm. In addition, a height from the bottom surface 5 to the top surface 3 is from 1 to 10 mm. Here, the height from the bottom surface 5 to the top surface 3 refers to a width between an upper end of the top surface 3 and a lower end of the bottom surface 5 in a direction parallel to the central axis O1.

The top cutting edges 9 are each disposed along ridge lines at intersections between the top surface 3 and the side surfaces 7. The bottom cutting edges 11 are each disposed along ridge lines at intersections between the bottom surface 5 and the side surfaces 7. The top cutting edges 9 and the bottom cutting edges 11 are used to cut a work material during machining. However, the top cutting edge 9 and the bottom cutting edge 11 are not used simultaneously, and only either is used during a single machining.

Specifically, in cases where the bottom surface 5 functions as the seat, the top cutting edges 9 are used during the machining. Conversely, in cases where the insert 1 is reversed and the top surface 3 functions as the seat, the bottom cutting edges 11 are used during the machining.

The regions where the top surface 3 and the side surfaces 7 intersect, where the top cutting edges 9 are formed, may be subjected to a honing process. That is, each of the ridge lines at intersections between the top surface 3 and the side surfaces 7 needs not have a strict linear shape by the intersection of the two faces. When the ridge line described above has a linear shape, strength of the top cutting edges 9 may decrease. Thus, the regions where the top surface 3 and the side surfaces 7 intersect are subjected to an R honing process whereby these regions are provided with a curved surface shape.

The top cutting edges 9 in the present embodiment include a first corner cutting edge 19, a first major cutting edge 21, a second corner cutting edge 23, and a second major cutting edge 25. The first corner cutting edge 19 is located on a ridge line in the first corner portion 15. The first major cutting edge 21 is adjacent to the first corner cutting edge 19. Specifically, the top cutting edges 9 include a pair of first major cutting edges 21 adjacent to the first corner cutting edge 19. The second corner cutting edge 23 is located on a ridge line in the second corner portion 17. The second major cutting edge 25 is adjacent to the second corner cutting edge 23. Specifically, the top cutting edges 9 include a pair of second major cutting edges 25 adjacent to the second corner cutting edge 23.

Accordingly, the first major cutting edge 21 and the second major cutting edge 25 are located on the edge of the top surface 3 between the first corner portion 15 and the second corner portion 17. The first corner cutting edge 19, the first major cutting edge 21, the second major cutting edge 25, and the second corner cutting edge 23 are arranged in this order from the first corner portion 15 toward the second corner portion 17.

The first corner cutting edge 19 and the second corner cutting edge 23 are located in the corner portions of the top surface 3. In a top view of the insert 1, the corner portions have a rounded shape. As such, when viewed from directly above, the first corner cutting edge 19 and the second corner cutting edge 23 each have an arc shape protruding outward. The first major cutting edge 21 and the second major cutting edge 25 are located on the edges of the top surface 3. As such, when viewed from directly above, the first major cutting edge 21 and the second major cutting edge 25 of the present embodiment each have a linear shape.

The insert 1 of the present embodiment is provided with the bottom cutting edge 11 that has the same configuration as the top cutting edge 9. A configuration is possible in which the insert 1 only includes the top cutting edge 9, but economic efficiency can be improved by also providing the bottom cutting edge 11 as in the present embodiment. As the bottom cutting edge 11 has the same configuration as the top cutting edge 9, the bottom cutting edge 11 includes cutting edge regions that correspond to the first corner cutting edge 19, the first major cutting edge 21, the second corner cutting edge 23, and the second major cutting edge 25 of the top cutting edge 9.

The top surface 3 of the present embodiment includes a first breaker protrusion 27 and a second breaker protrusion 29. The first breaker protrusion 27 and the second breaker protrusion 29 are each separated from the top cutting edges 9. The first breaker protrusion 27 and the second breaker protrusion 29 each have the role of curling chips that have advanced thereto.

As such, the first breaker protrusion 27 and the second breaker protrusion 29 include inclined surfaces 27a and 29a, respectively, that are inclined with ascending as a distance from the top cutting edges 9 increases. Additionally, bottom ends of these inclined surfaces 27a and 29a constitute the outer edges of the first breaker protrusion 27 and the second breaker protrusion 29. Here, an angle formed in a cross-section orthogonal to the top cutting edge 9 between an imaginary plane S orthogonal to the central axis O1 and the inclined surface 27a constitutes an angle of inclination θ5 of the inclined surface 27a. Additionally, an angle formed in a cross-section orthogonal to the top cutting edge 9 between the imaginary plane S orthogonal to the central axis O1 and the inclined surface 29a constitutes an angle of inclination θ6 of the inclined surface 29a.

The first breaker protrusion 27 and the second breaker protrusion 29 are each provided with a flat surface. Specifically, the first breaker protrusion 27 is provided with a flat first surface 31 on an upper end thereof. The second breaker protrusion 29 is provided with a flat second surface 33 on an upper end thereof. In cases where the top surface 3 is used as the seat in the holder, the first surface 31 and the second surface 33 function as surfaces that contact the holder. As such, the first surface 31 and the second surface 33 are positioned on the same plane.

In the insert 1 of the present embodiment, each of the first surface 31 and the second surface 33 is parallel with respect to the imaginary plane S orthogonal to the height direction. Additionally, a height from the imaginary plane S of each of the first surface 31 and the second surface 33 is uniform. Note that, the "height direction" mentioned above is a direction passing through the center of the top surface 3 and the center of the bottom surface 5 and, in the insert 1 of the present embodiment, matches the extending direction of the central axis O1 of the through-hole 13.

While not particularly illustrated, the bottom surface 5 of the insert 1 of the present embodiment has protrusions of the same configuration as the first breaker protrusion 27 and the second breaker protrusion 29 of the top surface 3.

In cases where the first corner portion 15 is an acute angle and machining is performed using the first corner cutting edge 19, a thickness of the chip becomes comparatively thicker. On the other hand, in cases where the second corner portion 17 is an obtuse angle and machining is performed using the second corner cutting edge 23, a thickness of the chip becomes comparatively thinner.

In the insert 1 of the present embodiment, when viewed from directly above, a gap W1 between the first breaker protrusion 27 and the first corner cutting edge 19 is larger than a gap W2 between the second breaker protrusion 29 and the second corner cutting edge 23.

As such, in cases where the bottom surface 5 has the same configuration as the top surface 3 as in the present embodiment and machining is performed using the second corner cutting edge 23 of the top surface 3, the insert 1 can be seated in the holder at a location close to directly beneath the second corner cutting edge 23. Accordingly, the insert 1 can be stably secured in the holder.

In cases where machining is performed using the first corner cutting edge 19, the thickness of the chips becomes thicker and less prone to deformation. As a result, it is necessary to secure a broad space for curling the chips. However, the gap W1 between the first breaker protrusion 27 and the first corner cutting edge 19 is secured and relatively large. As such, the possibility of the chips jamming in the vicinity of the first corner cutting edge 19 can be reduced.

Furthermore, in the insert 1 of the present embodiment, when viewed from directly above, a gap W3 between the first breaker protrusion 27 and the first major cutting edge 21 becomes larger as a distance from the first corner cutting edge 19 increases. As such, the possibility of the chips jamming in the vicinity of the first corner cutting edge 19 can be further reduced. Specifically, due to the fact that the gap W3 between the first breaker protrusion 27 and the first major cutting edge 21 has the configuration described above, the chips will advance easily in a direction away from a bisecting line of the first corner cutting edge 19. As such, the possibility of the chips jamming in the vicinity of the first corner cutting edge 19 can be reduced.

Additionally, a gap W4 between the second breaker protrusion 29 and the second major cutting edge 25 becomes smaller as a distance from the second corner cutting edge 23 increases. As such, the possibility of the chips jamming can be further reduced. Specifically, in cases where machining is performed using the second corner cutting edge 23, the thickness of the chips is thin and, therefore, the flow of the chips is prone to becoming unstable.

However, due to the fact that the gap W4 between the second breaker protrusion 29 and the second major cutting edge 25 has the configuration described above, the chips will advance easily in a direction toward a bisecting line of the second corner cutting edge 23. As such, it will be easier to divide the chips at an appropriate length. As a result, the possibility of the chips jamming can be reduced.

As described above, with the insert 1 of the present embodiment, good machining can be performed in cases where machining is performed using either of the first corner portion 15 with an acute angle and the second corner portion 17 with an obtuse angle.

Note that in the present embodiment, the gaps between the breaker protrusions and the cutting edges refer to distances between outer edges of the breaker protrusions and the cutting edges when viewing the insert 1 from directly above. In the present embodiment, the lower ends of the breaker protrusions partially constitute the outer peripheral edge of the breaker protrusions. As such, when viewed from above, the distances between the lower ends of the breaker protrusions and the cutting edges correspond to the gaps between the breaker protrusions and the cutting edges.

In the insert 1 of the present embodiment, the first major cutting edge 21 has a linear shape. Additionally, the lower end of the first breaker protrusion 27 has a linear shaped portion in a region facing the first major cutting edge 21. As such, when this portion is viewed from directly above, the gap W3 between the first breaker protrusion 27 and the first major cutting edge 21 becomes larger at a constant ratio as a distance from the first corner cutting edge 19 increases.

Specifically, in an optional point of the first major cutting edge 21, when a distance from an end portion adjacent to the first corner cutting edge 19 is X1, the gap W3 is expressed as W3=X1×a1+b1 (where a1 and b are constants). As such, in a case where the first major cutting edge 21 is used as a reference, when viewed from directly above, the linear shaped portion described above of the lower end of the first breaker protrusion 27 is inclined with respect to the first major cutting edge 21 at the constant a1. Thus, the area of the first surface 31 can be widely maintained and, at the same time, space can be secured for allowing the chips produced by the first corner cutting edge 19 to flow well.

In other words, in a top view of the insert 1 of the present embodiment, an imaginary line formed by extending the linear shaped portion of the outer edge of the first breaker protrusion 27 described above and an imaginary line formed by extending the first major cutting edge 21 intersect at an angle θ3.

In the insert 1 of the present embodiment, the second major cutting edge 25 has a linear shape. Additionally, the lower end of the second breaker protrusion 29 has a linear shaped portion in a region facing the second major cutting edge 25. As such, when this portion is viewed from directly above, the gap W4 between the second breaker protrusion 29 and the second major cutting edge 25 becomes smaller at a constant ratio as a distance from the second corner cutting edge 23 increases.

Specifically, in an optional point of the second major cutting edge 25, when a distance from an end portion adjacent to the second corner cutting edge 23 is X2, the gap W4 is expressed as W4=X2×a2+b2 (where a2 and b2 are constants). As such, in a case where the second major cutting edge 25 is used as a reference, when viewed from directly above, the linear shaped portion described above of the lower end of the second breaker protrusion 29 is inclined with respect to the second major cutting edge 25 at the constant a2. Thus, the possibility of the chips only coming in contact with a specific region of the inclined surface of the second breaker protrusion 29 can be reduced, and the possibility of the load becoming concentrated in this region can be reduced.

In other words, in a top view of the insert 1 of the present embodiment, an imaginary line formed by extending the linear shaped portion of the outer edge of the second breaker protrusion 29 described above and an imaginary line formed by extending the second major cutting edge 25 intersect at an angle θ4.

In the insert 1 of the present embodiment, the angle θ3 formed by the outer edge of the first breaker protrusion 27 and the first major cutting edge 21 is larger than the angle θ4 formed by the outer edge of the second breaker protrusion 29 and the second major cutting edge 25. That is, the angle θ3 is larger than the angle θ4.

In order to stably secure the insert 1 in the holder, in the insert 1 of the present embodiment, the bottom surface 5 has the same configuration as the top surface 3 and the gap W1 is larger than the gap W2. Here, it is easier to bring the second corner cutting edge 23 closer to the second breaker protrusion 29 by configuring the angle θ4 to be relatively smaller. As a result, the gap W2 easily becomes smaller.

Additionally, it is easier to bring the first corner cutting edge 19 closer to the first breaker protrusion 27 by configuring the angle θ3 to be relatively larger. As a result, conditions where the first corner cutting edge 19 must be located excessively far from the first breaker protrusion 27 can be avoided.

Additionally, when viewing the insert 1 of the present embodiment from directly above, a minimum value of the gap W3 between the first breaker protrusion 27 and the first major cutting edge 21 is greater than a minimum value of the gap W4 between the second breaker protrusion 29 and the second major cutting edge 25. As described previously, in cases where machining is performed using the first corner cutting edge 19, a broad space for curling the chips must be secured. The broad space for curling the chips can be secured by positioning the first breaker protrusion 27 and the second breaker protrusion 29 as described above.

The top surface 3 in the present embodiment has a rake surface 35 provided along the top cutting edge 9. The rake surface 35 has a role of raking the chips that are cut by the top cutting edge 9. Thus, the chips of the work material flow over a surface of the rake surface 35. To ensure smooth chip flow, the rake surface 35 is inclined with a height from the bottom surface 5 being uniform or decreasing as a distance of the rake surface 35 from the top cutting edge 9 increases.

In other words, in the insert 1 of the present embodiment, the rake surface 35 is inclined with a distance to the bottom surface 5 decreasing as a distance to the through-hole 13 decreases. A rake angle, which is the angle representing this inclination, is indicated by a maximum value of an angle formed by the rake surface 35 and a virtual plane S orthogonal to the central axis O1 in a cross section orthogonal to the top cutting edge 9. Additionally, the rake surface 35 has a linear shape in the cross section parallel to the central axis O1.

The insert 1 of the present embodiment includes a first rake surface 35a and a second rake surface 35b as the rake surface 35. The first rake surface 35a is located between the first breaker protrusion 27 and the first major cutting edge 21. The second rake surface 35b is located between the second breaker protrusion 29 and the second major cutting edge 25. Here, a rake angle θ7 of the first rake surface 35a and a rake angle θ8 of the second rake surface 35b are the same.

In cases where the rake angle θ7 of the first rake surface 35a and the rake angle θ8 of the second rake surface 35b are different from each other, a step may be created between the first rake surface 35a and the second rake surface 35b. Consequently, there may be a possibility of the chips jamming at this step. However, in cases where the rake angle θ7 and the rake angle θ8 are the same, this jamming of the chips does not easily occur.

As described above, the top surface 3 of the present embodiment is a surface that includes the first breaker protrusion 27, the second breaker protrusion 29, the rake surface 35, and other components.

Next, a cutting insert of a second embodiment is described in detail, using the drawings. However, configurations that are the same as in the cutting insert of the first embodiment are omitted and, primarily, points that differ from the cutting insert of the first embodiment are described.

Figure 9:
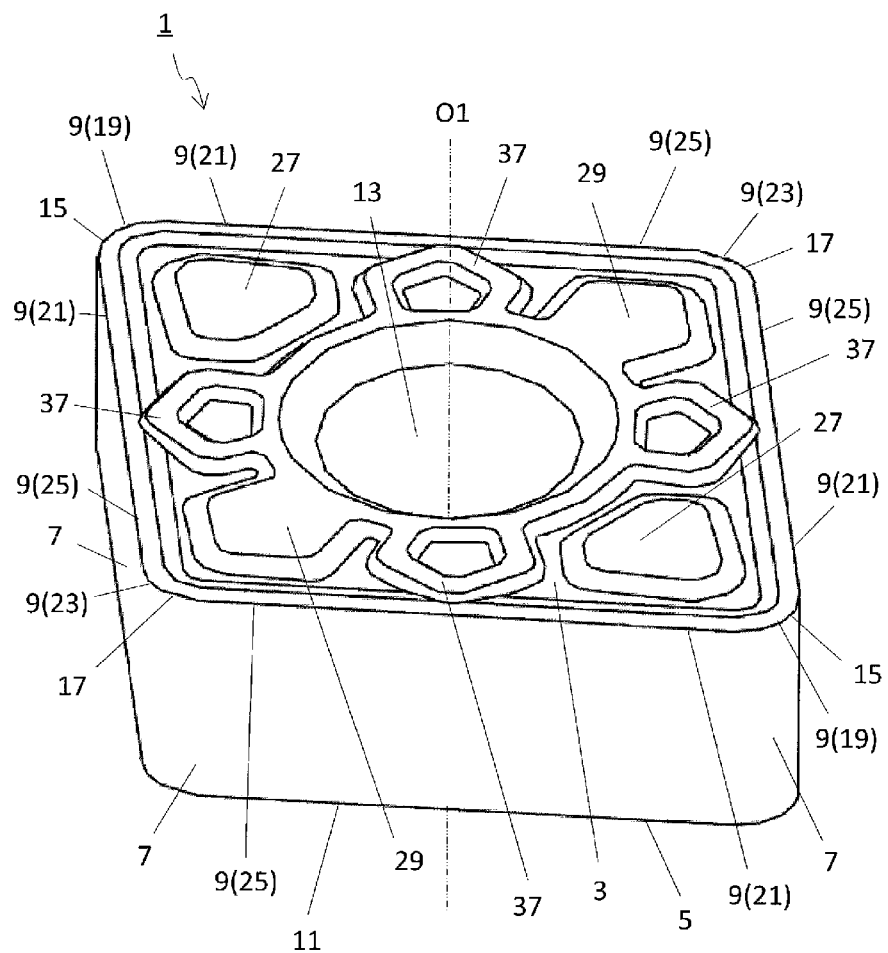
FIG. 9 is a perspective view illustrating a cutting insert of a second embodiment of the present invention.
Figure 10:
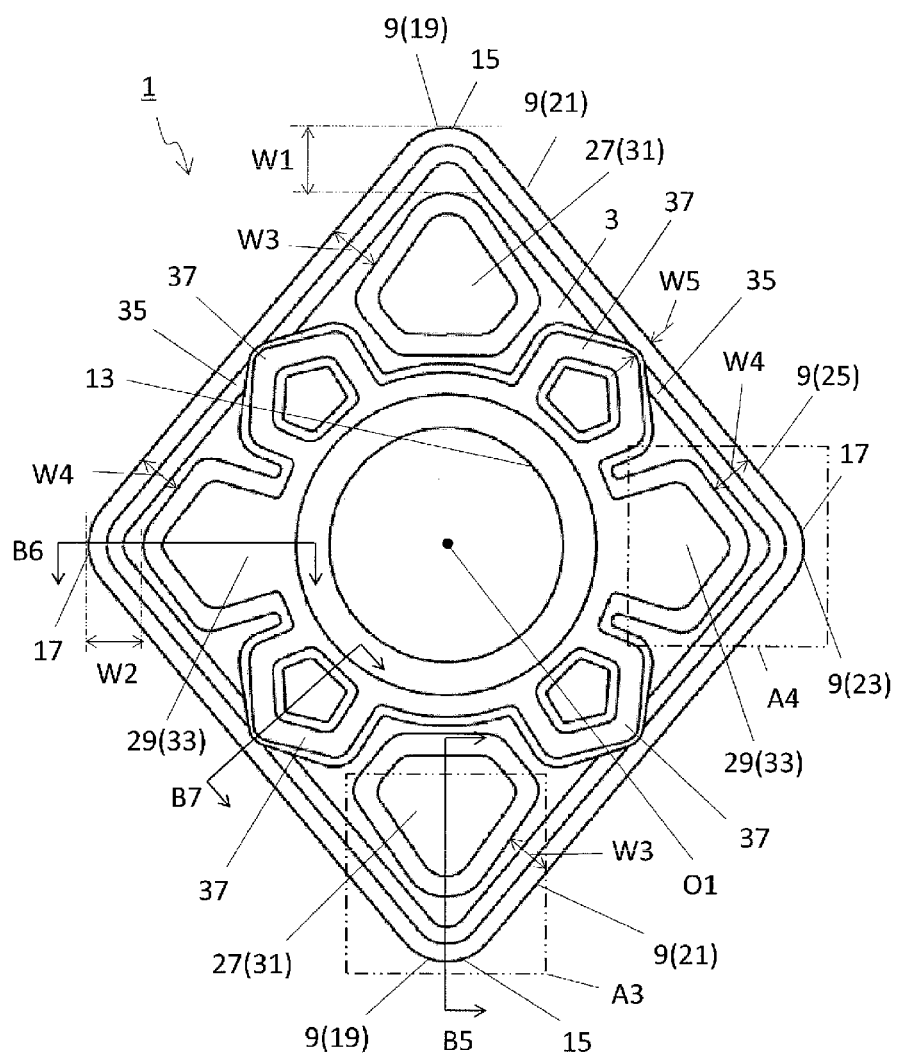
FIG. 10 is a top view of the cutting insert illustrated in FIG. 9.
Figure 11:
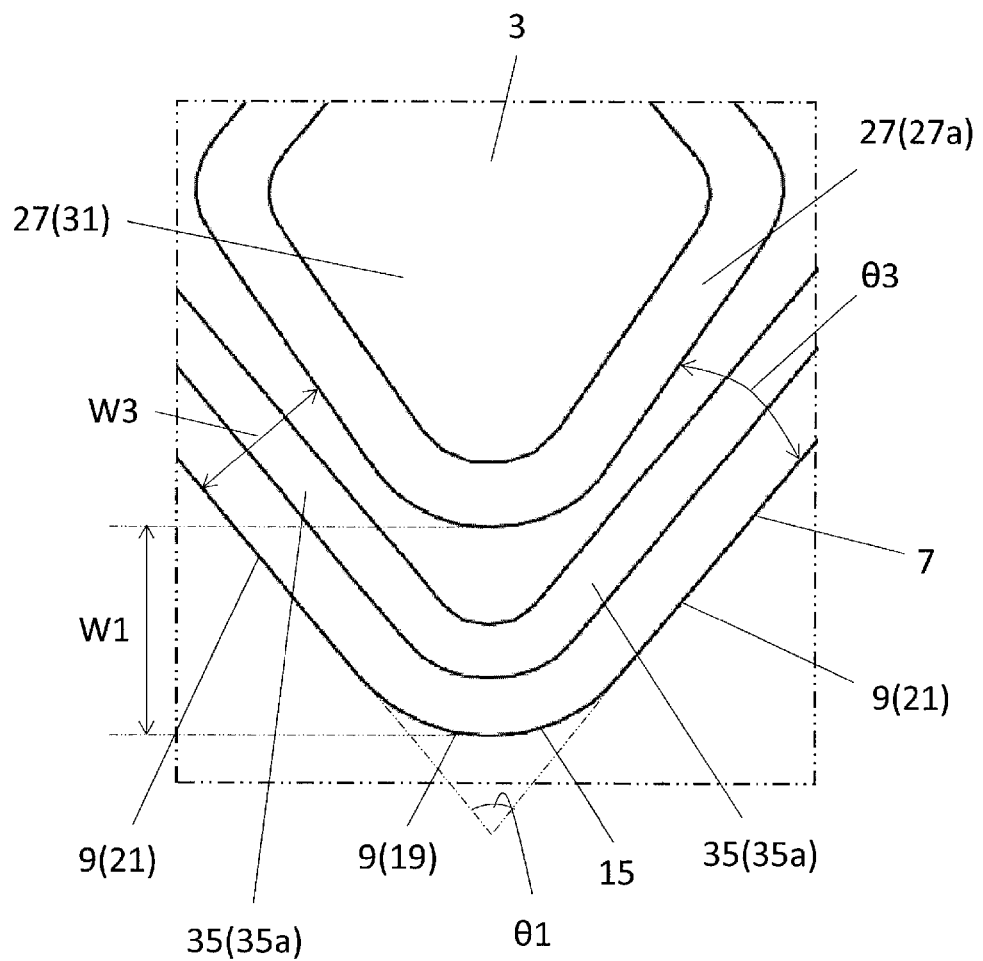
FIG. 11 is an enlarged top view of a region A3 of the cutting insert illustrated in FIG. 10.
Figure 12:
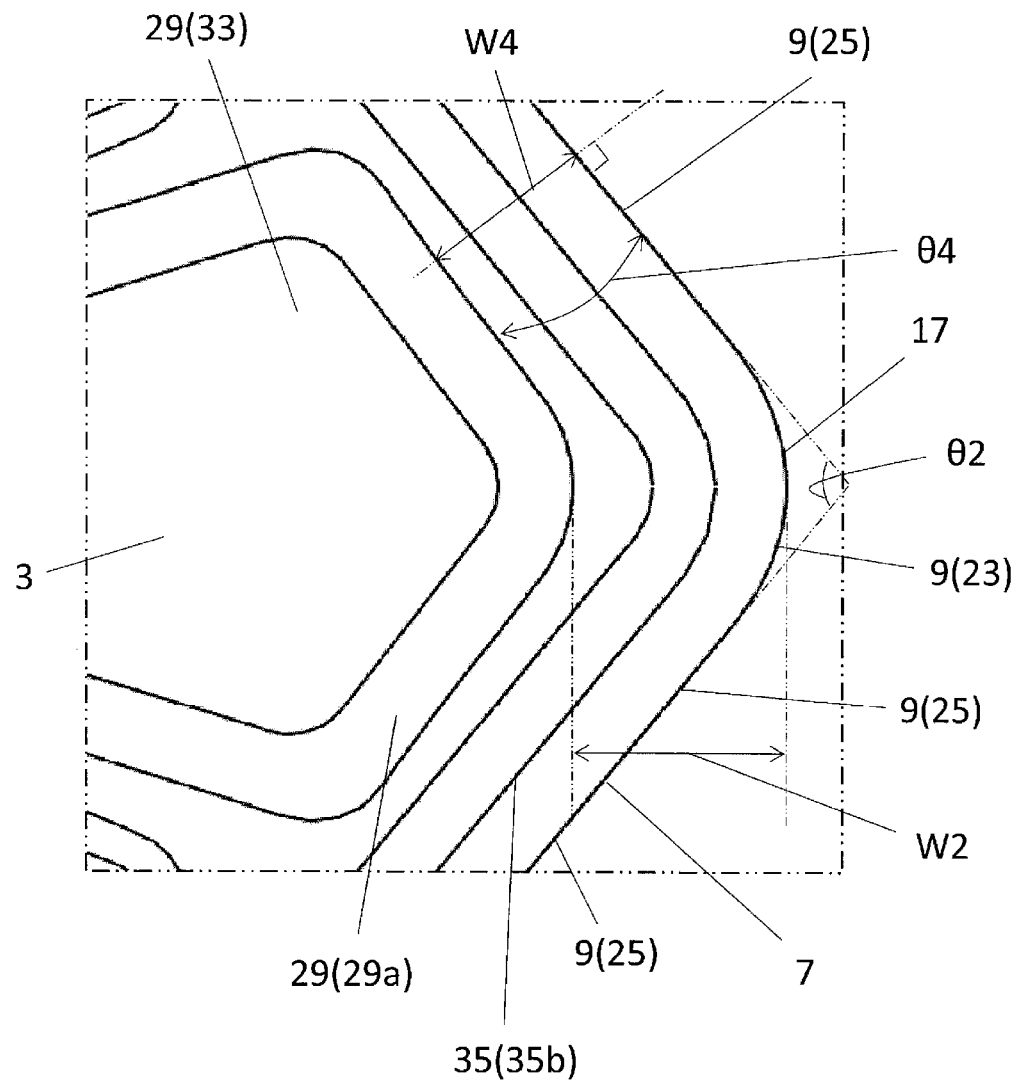
FIG. 12 is an enlarged top view of a region A4 of the cutting insert illustrated in FIG. 10.
Figure 13:
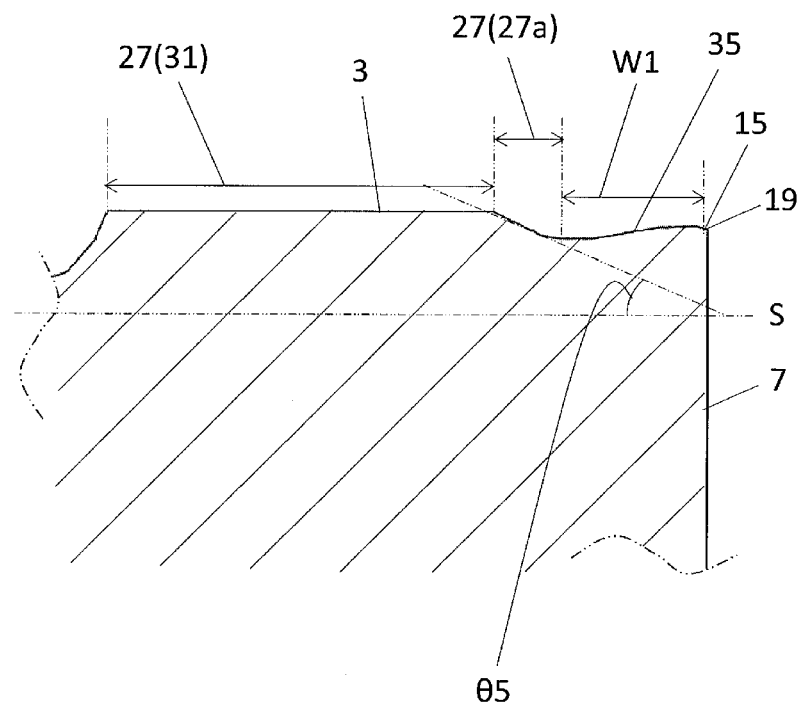
FIG. 13 is a cross-sectional view along a cross-section B5-B5 of the cutting insert illustrated in FIG. 10.
Figure 14:
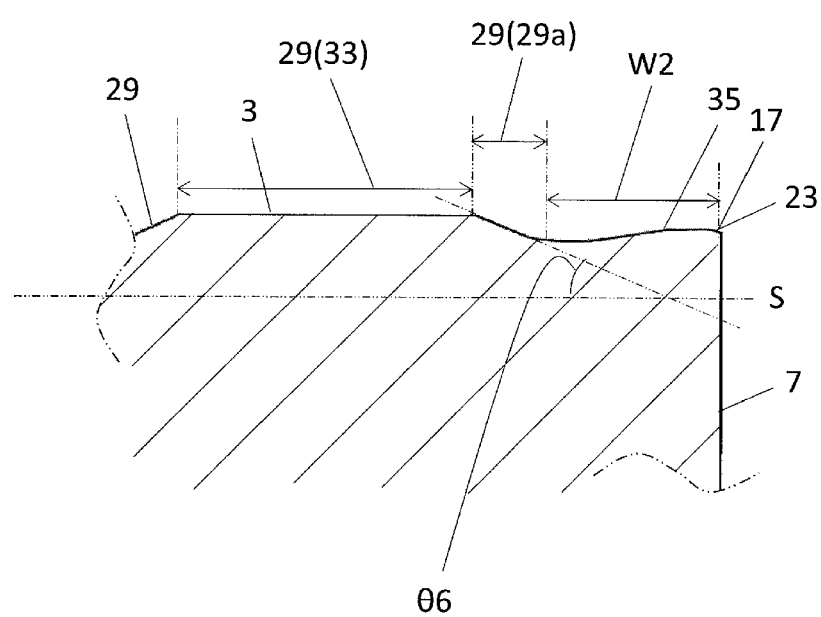
FIG. 14 is a cross-sectional view along a cross-section B6-B6 of the cutting insert illustrated in FIG. 10.
Figure 15:
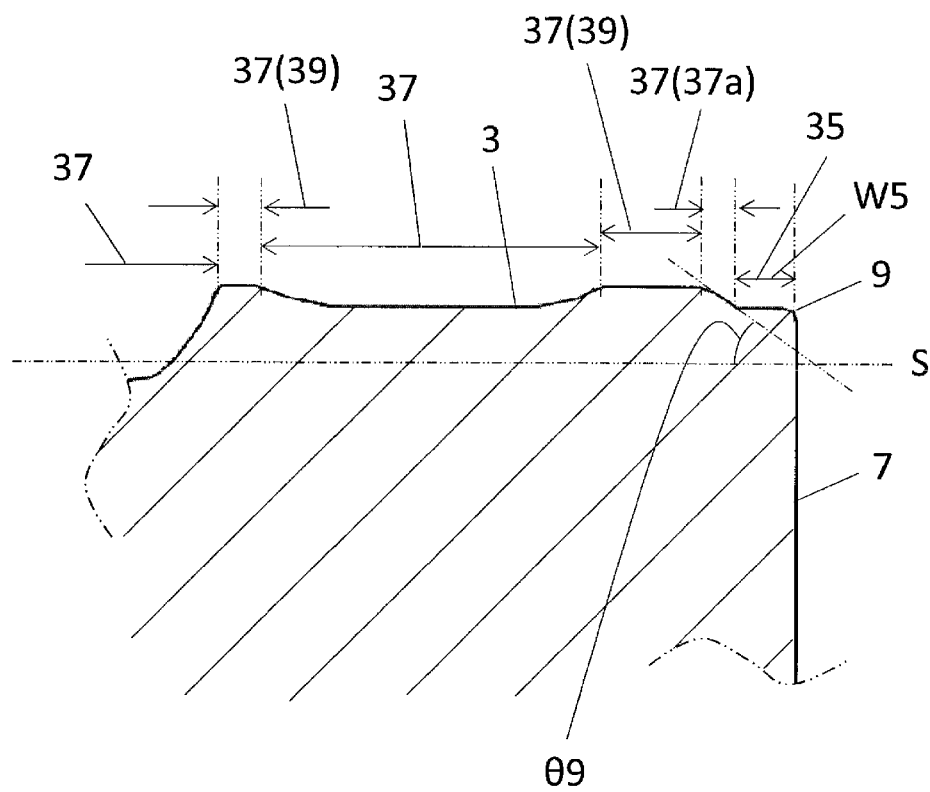
FIG. 15 is a cross-sectional view along a cross-section B7-B7 of the cutting insert illustrated in FIG. 10.

As illustrated in FIG. 9, an insert 1 of the present embodiment includes a top surface 3, a bottom surface 5, side surfaces 7, top cutting edges 9, bottom cutting edges 11, and a through-hole 13, the same as in the insert of the first embodiment. Examples of the material of the insert 1 include cemented carbide alloy, cermet, or the like.

As in the insert of the first embodiment, the top surface 3 of the present embodiment includes a first breaker protrusion 27, a second breaker protrusion 29, and a rake surface 35. In addition to the first breaker protrusion 27 and the second breaker protrusion 29, the insert 1 of the present embodiment also includes a third breaker protrusion 37. When viewed from directly above, the third breaker protrusion 37 is located between the first breaker protrusion 27 and the second breaker protrusion 29, and protrudes toward an edge of the top surface 3.

Due to such a third breaker protrusion 37 being provided, in cases where one of the first corner cutting edge 19 and the second corner cutting edge 21 is used for machining, the possibility of the other cutting edge being damaged can be reduced. For example, in cases where machining is performed using the first corner cutting edge 19, even if the chip extends toward the second corner portion 17, the third breaker protrusion 37 serves as a barrier to the chip. As such, the possibility of the second corner cutting edge 23 becoming damaged is reduced. Likewise, in cases where machining is performed using the second corner cutting edge 23, even if the chip extends toward the first corner portion 15, the third breaker protrusion 37 serves as a barrier to the chip.

Furthermore, here, when viewing the insert 1 from directly above, a minimum value of a gap W5 between the third breaker protrusion 37 and the edge of the top surface is less than a minimum value of a gap W3 between the first breaker protrusion 27 and the first major cutting edge 21, and also less than a minimum value of a gap W4 between the second breaker protrusion 29 and the second major cutting edge 25. In cases where the third breaker protrusion 37 is located in this manner, the chip can be more stably prevented from advancing in the third breaker protrusion 37.

Particularly, in order to more stably prevent the chip from advancing in the third breaker protrusion 37, it is preferable that the third breaker protrusion 37 protrude up to the rake surface 35, as in the present embodiment.

As with the first breaker protrusion 27 and the second breaker protrusion 29, the third breaker protrusion 37 includes an inclined surface 37a inclined with ascending as a distance from the top cutting edge 9 increases. Here, an angle of inclination θ9 of the inclined surface 37a in the third breaker protrusion 37, that is, a maximum value of a rise angle θ9 is greater than an angle of inclination θ5 of the inclined surface in the first breaker protrusion 27, that is, a maximum value of a rise angle θ5, and is also greater than an angle of inclination θ6 of the inclined surface in the second breaker protrusion 29, that is, a maximum value of a rise angle θ6.

In cases where the maximum value of the rise angle θ9 of the third breaker protrusion 37 is small, that is, where the inclined surface in the third breaker protrusion 37 is a gentle inclination, the chip that has advanced toward the third breaker protrusion 37 may easily overcome the third breaker protrusion 37. However, due to the maximum value of the rise angle of the third breaker protrusion 37 being configured to be a relatively large value, it may be difficult for the chip to overcome the third breaker protrusion 37. As such, the chip can be more stably prevented from advancing in the third breaker protrusion 37.

Note that the angle of inclination θ9 of the inclined surface 37a is indicated by an angle formed by the inclined surface 37a and a virtual plane S orthogonal to the central axis O1 in a cross section orthogonal to the top cutting edge 9.

Additionally, as with the first breaker protrusion 27 and the second breaker protrusion 29, the third breaker protrusion 37 is provided with a flat third surface 39 on an upper end thereof. In cases where the top surface 3 is used as the seat in the holder, the third surface 39 functions as a surface that contacts the holder. As such, the third surface 39 is positioned on the same plane as the first surface 31 and the second surface 33.

Cutting Tool

Next, description will be given of a cutting tool 101 of one embodiment using drawings.

Figure 16:
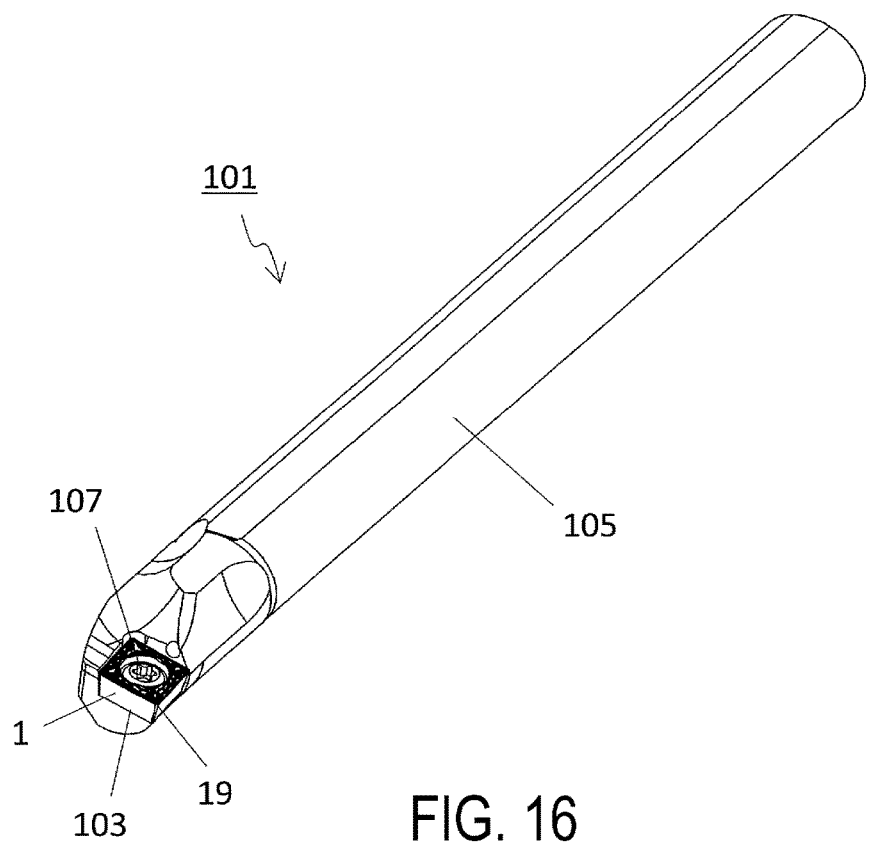
FIG. 16 is a perspective diagram illustrating a cutting tool of one embodiment of the present invention.

The cutting tool 101 in the present embodiment is provided with a holder 105 and the above-described cutting insert 1. The holder 105 includes an insert pocket 103 on a side of a front end. The cutting insert 1 is configured to be mounted to the insert pocket 103 with the top cutting edge or the bottom cutting edge protruding from the front end of the holder 105, as illustrated in FIG. 16. The insert 1 is mounted, in the cutting tool 101 of the present embodiment, with the first corner cutting edge 19 protruding from the front end of the holder 105.

The holder 105 forms a long and slender rod shape. Also, the front end side of the holder 105 is provided with one insert pocket 103. The insert pocket 103 is a portion to which the insert is mounted, and is opened to a front end surface of the holder 105. Here, the insert pocket 103 is also opened to a side surface of the holder 105, making it possible to easily mount the insert 1. Specifically, the insert pocket 103 includes a seating face and a binding side face. The seating face is parallel to a bottom surface of the holder 105. The binding side face is inclined with respect to the seating face.

The insert 1 is configured to be mounted to the insert pocket 103. The insert 1 is mounted with the top cutting edge or the bottom cutting edge protruding to the front end side of the holder 105. In the present embodiment, the insert 1 is mounted to the holder 105 using a fixing screw 107. Specifically, the insert 1 is mounted to the holder 105 by inserting the fixing screw 107 into a through-hole in the insert 1, inserting a tip of this fixing screw 107 into a screw hole formed in the insert pocket 103, and screwing thread portions thereof.

For the holder 105, it is possible to use steel, cast iron, or the like. In particular, it is preferable to use steel with a high toughness in these members.

Method for Manufacturing a Machined Product

Next, a description will be given of a method for manufacturing a machined product of one embodiment of the present invention, using the drawings.

The machined product is manufactured by machining a work material 201. The method for manufacturing a machined product in the present embodiment includes the following steps. Specifically the steps of:

(1) rotating a work material 201;

(2) bringing the top cutting edge or the bottom cutting edge of the cutting tool 101 into contact with the work material 201 that is rotating; and (3) separating the cutting tool 101 from the work material 201 are provided.

Figure 17A:
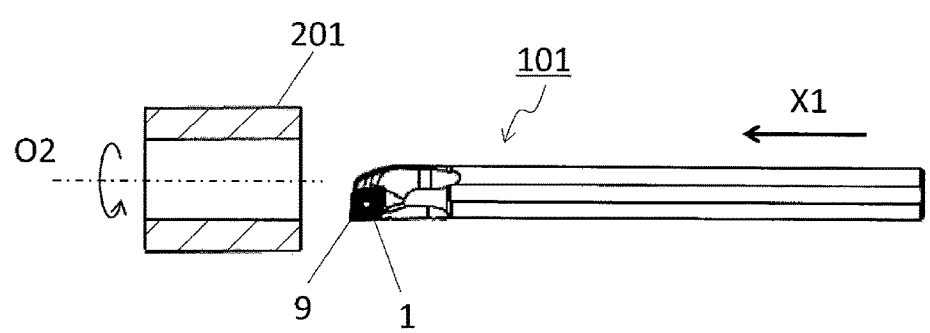
FIG. 17A is a schematic view illustrating one step of the method for manufacturing a machined product of one embodiment.
Figure 17B:
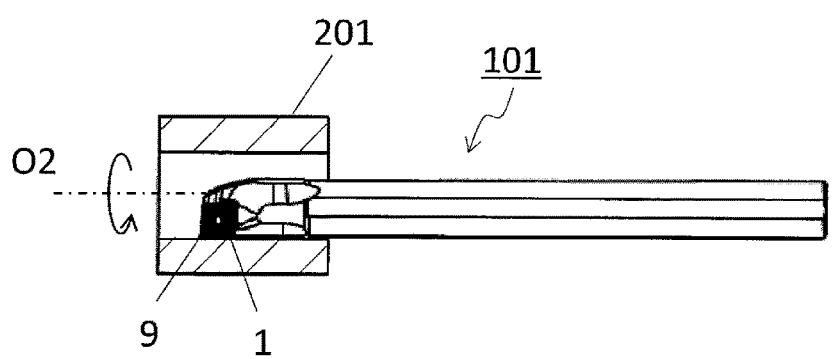
FIG. 17B is a schematic view illustrating one step of the method for manufacturing a machined product of one embodiment.
Figure 17C:
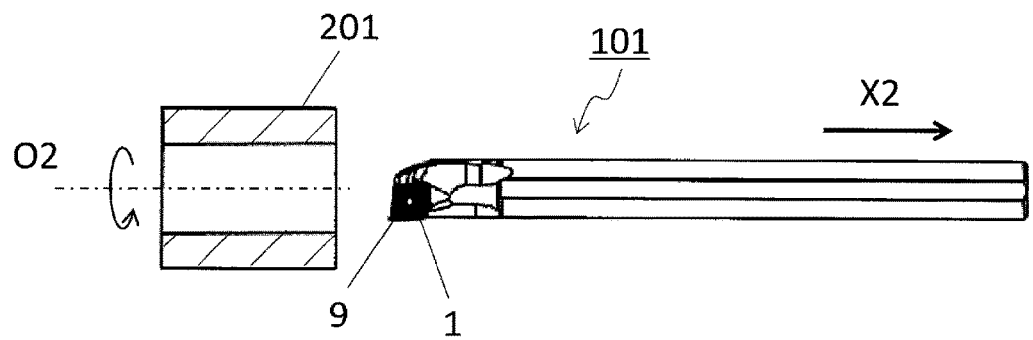
FIG. 17C is a schematic view illustrating one step of the method for manufacturing a machined product of one embodiment.

More specifically, first, as illustrated in FIG. 17A, the work material 201 is rotated about an axis O2, and the cutting tool 101 is brought relatively close to the work material 201. Next, as illustrated in FIG. 17B, the top cutting edge 9 of the cutting tool 101 is brought into contact with the work material 201, and the work material 201 is cut. Then, as illustrated in FIG. 17C, the cutting tool 101 is relatively moved away from the work material 201.

In the present embodiment, the cutting tool 101 is brought close to the work material 201 by moving the cutting tool 101 in the X1 direction in a state where the axis O2 is fixed and the work material 201 is rotating. Furthermore, in FIG. 17B, the work material 201 is cut by bringing the top cutting edge 9 of the cutting insert into contact with the work material 201 that is rotating. Furthermore, in FIG. 17C, the cutting tool 101 is moved away from the work material 201 by moving the cutting tool 101 in the X2 direction in a state where the work material 201 is rotating.

Here, in the machining of the manufacturing method of the present embodiment, in each of these steps, the cutting tool 101 is brought into contact with or separated from the work material 201 by moving the cutting tool 101. However, the present embodiment is of course not limited thereto.

For example, in step (1), the work material 201 may be brought close to the cutting tool 101. In the same manner, in step (3), the work material 201 may be moved away from the cutting tool 101. In a case where the machining is to be continued, steps of bringing the top cutting edge 9 of the cutting insert 1 into contact with different positions of the work material 201 may be repeated by maintaining the rotating state of the cutting tool 201.

Here, representative examples of the material of the work material 201 include carbon steel, alloy steel, stainless steel, cast iron, non-ferrous metals, or the like.

REFERENCE SIGNS LIST

1 Cutting insert (insert)
3 Top surface
5 Bottom surface
7 Side surface
9 Top cutting edge
11 Bottom cutting edge
13 Through-hole
15 First corner portion
17 Second corner portion
19 First corner cutting edge
21 First major cutting edge
23 Second corner cutting edge
25 Second major cutting edge
27 First breaker protrusion
27a Inclined surface
29 Second breaker protrusion
29a Inclined surface
31 First surface
33 Second surface
35 Rake surface
35a First rake surface
35b Second rake surface
37 Third breaker protrusion
39 Third surface
101 Cutting tool
103 Insert pocket
105 Holder
107 Fixing screw
201 Work material

The invention claimed is:

1. A cutting insert comprising:
a top surface having a polygonal shape in a top view, and comprising a first corner portion with an acute angle $\theta 1$ and a second corner portion with an obtuse angle $\theta 2$;
a bottom surface;
a side surface located between the top surface and the bottom surface; and
a top cutting edge disposed along a ridge line at an intersection between the top surface and the side surface, and comprising:
 a first corner cutting edge located in the first corner portion;
 a first major cutting edge adjacent to the first corner cutting edge;
 a second corner cutting edge located in the second corner portion; and
 a second major cutting edge adjacent to the second corner cutting edge;
wherein the top surface further comprises:
 a first breaker protrusion comprising a first part protruding toward the first corner portion and a second part facing the first major cutting edge in a top view; and
 a second breaker protrusion comprising a third part protruding toward the second corner portion and a fourth part facing the second major cutting edge in the top view,
wherein a minimum value of a first gap W1 between the first part and the first corner cutting edge is larger than a minimum value of a second gap W2 between the third part and the second corner cutting edge in the top view, and
wherein a third gap W3 between the second part and the first major cutting edge increases from the first corner portion toward the second corner portion, and a fourth gap W4 between the fourth part and the second major cutting edge decreases from the second corner portion toward the first corner portion in the top view,
the third gap W3 increases at a constant ratio, and the fourth gap W4 decreases at a constant ratio in the top view.

2. The cutting insert according to claim 1, wherein an angle $\theta 3$ formed by an outer edge of the second part and the first major cutting edge is larger than an angle $\theta 4$ formed by an outer edge of the fourth part and the second major cutting edge in the top view.

3. A cutting insert comprising:
a top surface having a polygonal shape in a top view, and comprising a first corner portion with an acute angle $\theta 1$ and a second corner portion with an obtuse angle $\theta 2$;
a bottom surface;
a side surface located between the top surface and the bottom surface; and
a top cutting edge disposed along a ridge line at an intersection between the top surface and the side surface, and comprising:
 a first corner cutting edge located in the first corner portion;
 a first major cutting edge adjacent to the first corner cutting edge;
 a second corner cutting edge located in the second corner portion; and
 a second major cutting edge adjacent to the second corner cutting edge;
wherein the top surface further comprises:

a first breaker protrusion comprising a first part protruding toward the first corner portion and a second part facing the first major cutting edge in a top view; and a second breaker protrusion comprising a third part protruding toward the second corner portion and a fourth part facing the second major cutting edge in the top view, wherein a minimum value of a first gap W1 between the first part and the first corner cutting edge is larger than a minimum value of a second gap W2 between the third part and the second corner cutting edge in the top view, wherein a third gap W3 between the second part and the first major cutting edge increases from the first corner portion toward the second corner portion, and a fourth gap W4 between the fourth part and the second major cutting edge decreases from the second corner portion toward the first corner portion in the top view, and wherein a minimum value of the third gap W3 is greater than a minimum value of the fourth gap W4 in the top view.

4. A cutting insert comprising:

a top surface having a polygonal shape in a top view, and comprising a first corner portion with an acute angle $\theta 1$ and a second corner portion with an obtuse angle $\theta 2$;

a bottom surface;

a side surface located between the top surface and the bottom surface; and a top cutting edge disposed along a ridge line at an intersection between the top surface and the side surface, and comprising:

a first corner cutting edge located in the first corner portion;

a first major cutting edge adjacent to the first corner cutting edge;

a second corner cutting edge located in the second corner portion; and a second major cutting edge adjacent to the second corner cutting edge;

wherein the top surface further comprises:

a first breaker protrusion comprising a first part protruding toward the first corner portion and a second part facing the first major cutting edge in a top view;

a second breaker protrusion comprising a third part protruding toward the second corner portion and a fourth part facing the second major cutting edge in the top view;

a first rake face located between the second part and the first major cutting edge; and a second rake face located between the fourth part and the second major cutting edge, wherein a rake angle $\theta 7$ of the first rake face is the same as a rake angle $\theta 8$ of the second rake face, wherein a minimum value of a first gap W1 between the first part and the first corner cutting edge is larger than a minimum value of a second gap W2 between the third part and the second corner cutting edge in the top view;

wherein a third gap W3 between the second part and the first major cutting edge increases from the first corner portion toward the second corner portion, and a fourth gap W4 between the fourth part and the second major cutting edge decreases from the second corner portion toward the first corner portion in the top view.

5. The cutting insert according to claim 1, wherein:

the top surface further comprises a third breaker protrusion located between the first breaker protrusion and the second breaker protrusion, and projecting toward an edge of the top surface.

6. The cutting insert according to claim 5, wherein:

a minimum value of a fifth gap W5 between the third breaker protrusion and the edge of the top surface is less than the minimum value of the third gap W3, and is less than the minimum value of the fourth gap W4 in the top view.

7. The cutting insert according to claim 5, wherein:

a maximum value of a rise angle $\theta 9$ of the third breaker protrusion is greater than a maximum value of a rise angle $\theta 5$ of the first breaker protrusion, and is greater than a maximum value of a rise angle $\theta 6$ of the second breaker protrusion.

8. A cutting tool comprising:

a holder comprising an insert pocket on a side of a front end thereof; and the cutting insert according to claim 1, configured to be mounted to the insert pocket with the top cutting edge protruding from the front end of the holder.

9. A method for manufacturing a machined product, the method comprising:

rotating a work material;

bringing the top cutting edge of the cutting tool according to claim 8 into contact with the work material that is rotating; and separating the cutting tool from the work material.

* * * * *